United States Patent
Holmes (10) Patent No.: US 6,755,122 B2
(45) Date of Patent: Jun. 29, 2004

(54) DISCHARGEABLE STORAGE DEVICE FOR DISTRIBUTING FOOD OVER A SURFACE

(75) Inventor: William C. Holmes, Cape Elizabeth, ME (US)

(73) Assignee: Domino's Pizza PMC, Inc., Ann Arbor, MI (US)

( * ) Notice: Subject to any disclaimer, the term of this patent is extended or adjusted under 35 U.S.C. 154(b) by 35 days.

(21) Appl. No.: 10/209,303

(22) Filed: Jul. 31, 2002

(65) Prior Publication Data

US 2004/0020375 A1 Feb. 5, 2004

(51) Int. Cl.[7] .............................. A21C 9/04; B02C 5/00; A23C 19/00; A23L 1/00
(52) U.S. Cl. ......................... 99/494; 99/450.1; 99/452; 118/24; 118/31; 209/236
(58) Field of Search .................. 99/452–455, 456–459, 99/494, 516, 450.1; 118/13, 16, 18, 24, 31, 15, 27, 314, 324; 209/236

(56) References Cited

U.S. PATENT DOCUMENTS

| | | | | |
|---|---|---|---|---|
| 4,197,794 A | * | 4/1980 | Raque et al. | 99/450.1 |
| 4,497,244 A | * | 2/1985 | Koppens | 99/494 |
| 5,109,760 A | | 5/1992 | Ansari | |
| 5,678,476 A | | 10/1997 | Sanders | |
| 6,032,610 A | | 3/2000 | Fitch, Jr. et al. | |

* cited by examiner

Primary Examiner—Timothy F. Simone
(74) Attorney, Agent, or Firm—Brooks Kushman P.C.

(57) ABSTRACT

A dischargeable storage device instantaneously moveable between a store position and a discharge position. The dischargeable storage device includes a deck having a pair of pivotable trap doors. Each door has a guide post. The dischargeable storage device has a plunger having two guide channels. The plunger is moveable within the aperture. Each guide channel is adapted to cooperate with one of the guide posts such that when the plunger is depressed, the guide posts travel along the guide channels allowing the trap doors to open. An apparatus for for evenly distributing portions of food having a dischargeable storage device is also disclosed.

14 Claims, 6 Drawing Sheets

DISCHARGEABLE STORAGE DEVICE FOR DISTRIBUTING FOOD OVER A SURFACE

BACKGROUND OF THE INVENTION

1. Field of the Invention

The present invention relates to a dischargeable storage device and an apparatus comprising a dischargeable storage device for evenly distributing food over a surface.

2. Background Art

In the manufacture of certain food items, such as pizza, it is necessary to evenly distribute food over a surface. For instance, in making pizzas, the cheese should be evenly distributed over the surface of the pizza.

The popularity of pizza, and the high volume production thereof, necessitates that pizza ingredients should be evenly distributed over the surface of the pizza for quality, economical, and aesthetic purposes. Even distribution of cheese helps to give the pizza an attractive, consistent appearance; uniform baking characteristics; and uniform cutting and taste characteristics.

Originally, distributing cheese over the surface of a pizza was done by hand. However, this method failed to produce consistent and accurate results.

U.S. Pat. No. 5,109,760 issued to Ansari and assigned to the same assignee as the present application, discloses an apparatus for evenly distributing food over a surface, and in particular, to an apparatus for evenly distributing a predetermined amount of cheese on the surface of a pizza. While the invention described by the '760 patent proved successful, improvements were made thereto.

SUMMARY OF THE INVENTION

According to one aspect of the present invention, a dischargeable storage device instantaneously moveable between a store position and a discharge position is provided. The dischargeable storage device includes a deck having an aperture therethrough and a pair of pivotable trap doors. Each door has a guide post. The dischargeable storage device has a plunger having two guide channels. The plunger is moveable within the aperture. Each guide channel is adapted to cooperate with one of the guide posts such that when the plunger is depressed, the guide posts travel along the guide channels allowing the trap doors to open.

According to another aspect of the present invention, an apparatus for evenly distributing predetermined portions of food over a surface is provided. The apparatus includes a frame adapted to be superimposed over the surface to receive the food. A screen mounted on the frame and being of conical configuration and converging away from the direction of the surface to receive the food is also included. The screen has an axis and a plurality of openings defined therein through which the food may fall. A hopper is mounted on the frame in spaced relationship above the screen having a food confinement portion substantially aligned with the screen axis. The apparatus also includes a dischargeable storage device substantially aligned with the screen axis.

According to yet another aspect of the present invention, an apparatus for evenly distributing predetermined portions of food over a surface is provided. The apparatus has a frame, a screen having a cone at the apex of the screen, a hopper, and a dischargeable storage device.

The above features of the present invention are readily apparent from the following detailed description of the best mode for carrying out the invention when taken in connection with the accompanying drawings.

DETAILED DESCRIPTION OF THE PREFERRED EMBODIMENT(S)

With reference to FIGS. 1–10, the apparatus 10 for evenly distributing predetermined food portions 11 such as cheese of the present invention is described. The apparatus 10 includes a support 12 having a plurality of inwardly projecting braces 18. The apparatus also includes a frame 20 that may be placed of the braces 18 such that the apparatus 10 is positionable over a surface 15 that will receive the evenly distributed food portions 11. The support 12 may have a front brace 13 and a rear brace 14 adapted to at least temporarily secure to rear rail 17 and front rail 16 of a make line (not shown). Alternatively, the support may be attached to a wall (not shown). The apparatus 10 as shown provides for evenly distributed food portions over a round surface and therefore the frame 20 and other components are cylindrical. If the surface 15 that will receive the food portion 11 is shaped otherwise, the frame 20 and other components of the apparatus 10 may also be shaped accordingly.

Figure 1:
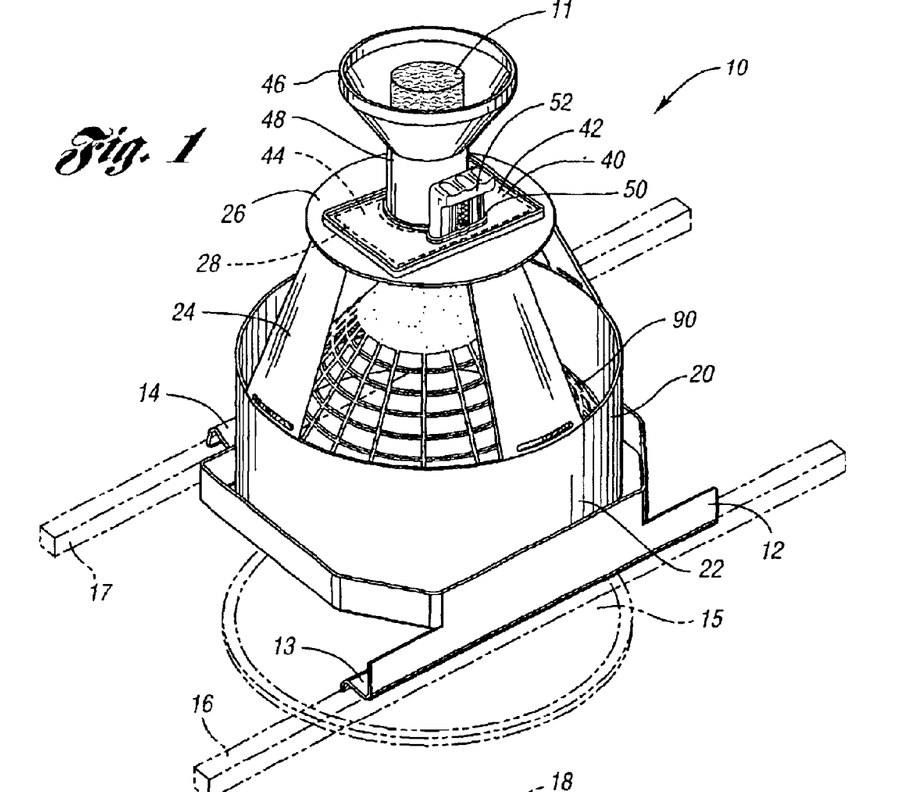
FIG. 1 is a perspective view of the apparatus for evenly distributing predetermined portions of food of the present invention.
Figure 2:
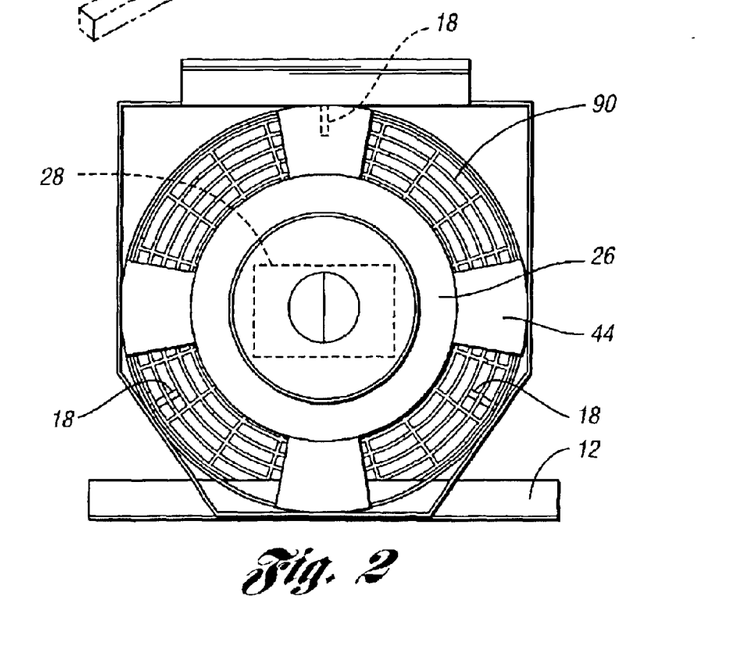
FIG. 2 is a top view of the apparatus for evenly distributing predetermined portions of food over a surface of the present invention.
Figure 3:
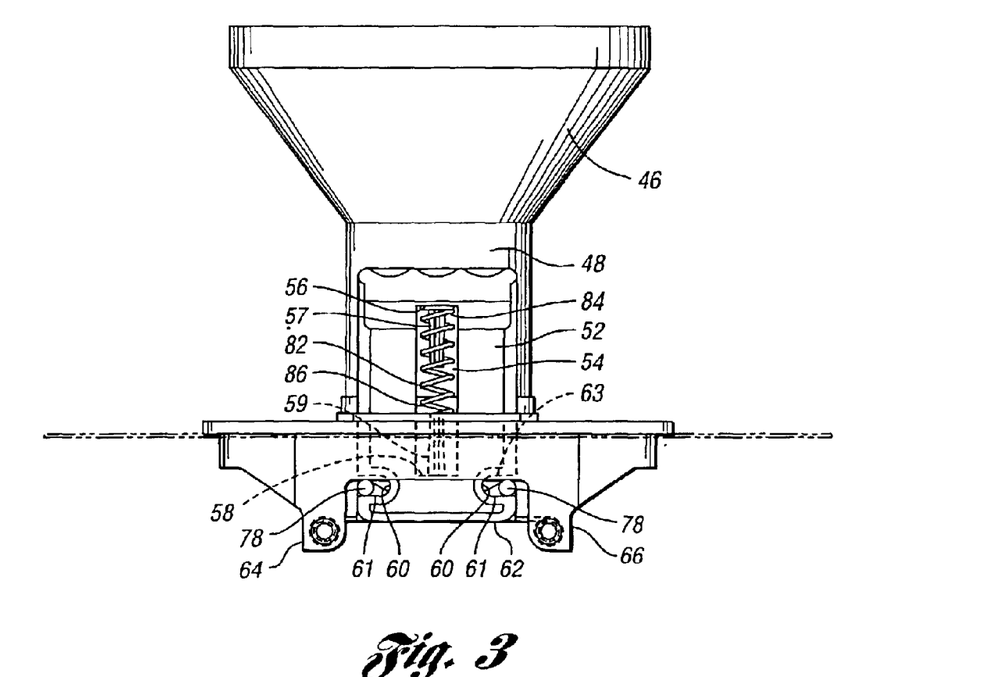
FIG. 3 is a front view of the dischargeable storage device of the present invention.
Figure 4:
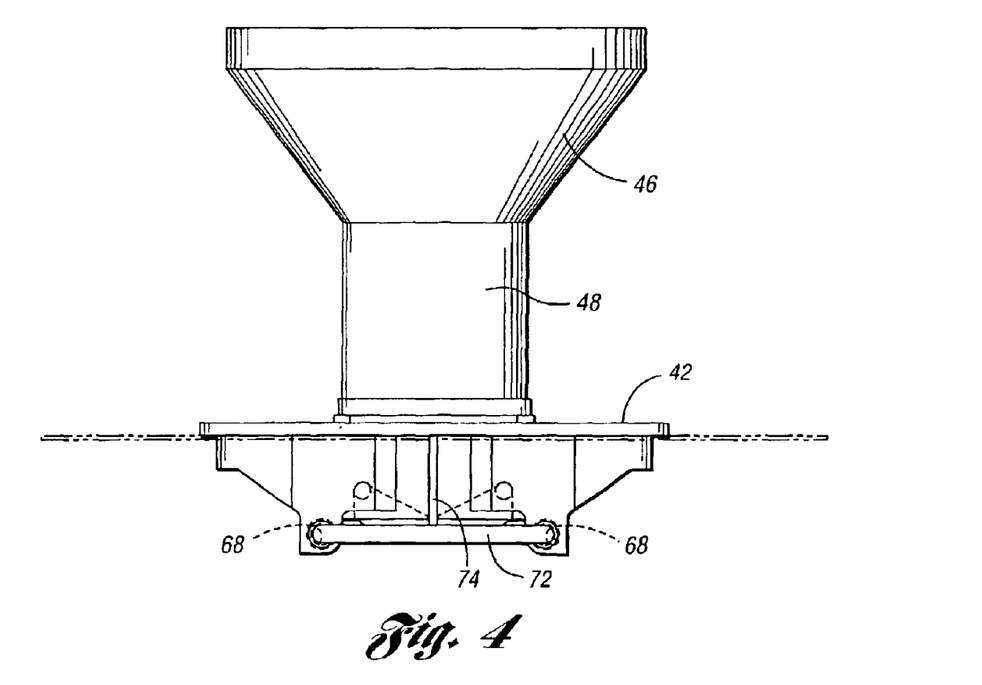
FIG. 4 is a rear view of the dischargeable storage device of the present invention.
Figure 5:
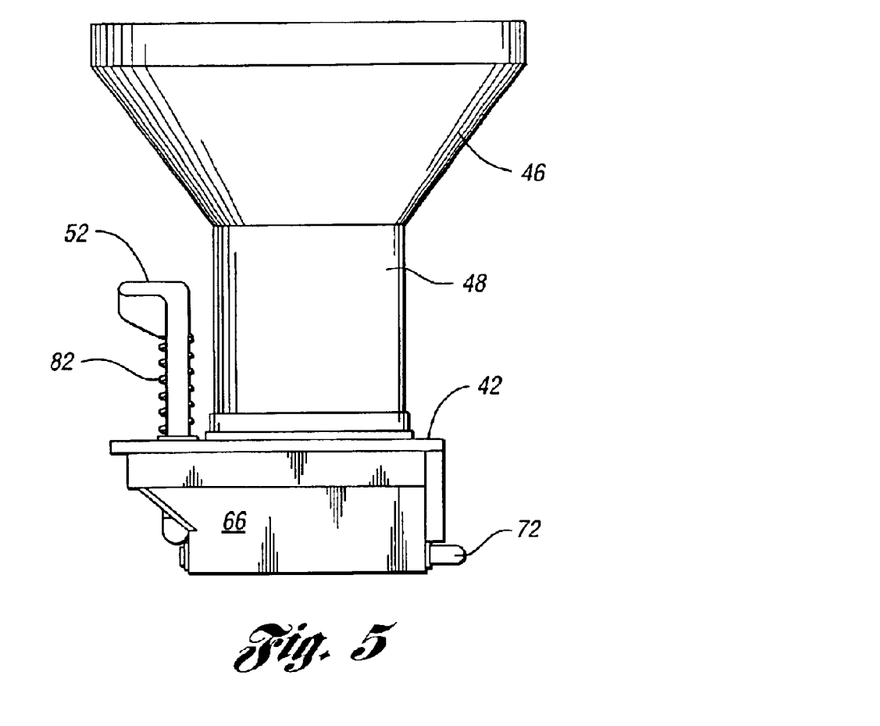
FIG. 5 is a side view of the dischargeable storage device of the present invention.
Figure 6:
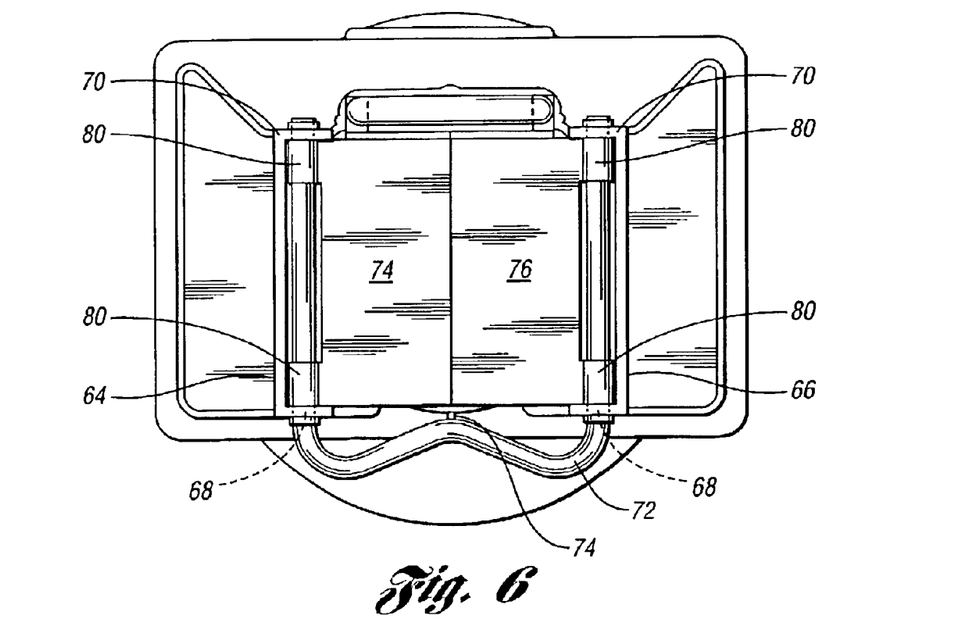
FIG. 6 is a bottom view of the dischargeable storage device of the present invention.
Figure 11:
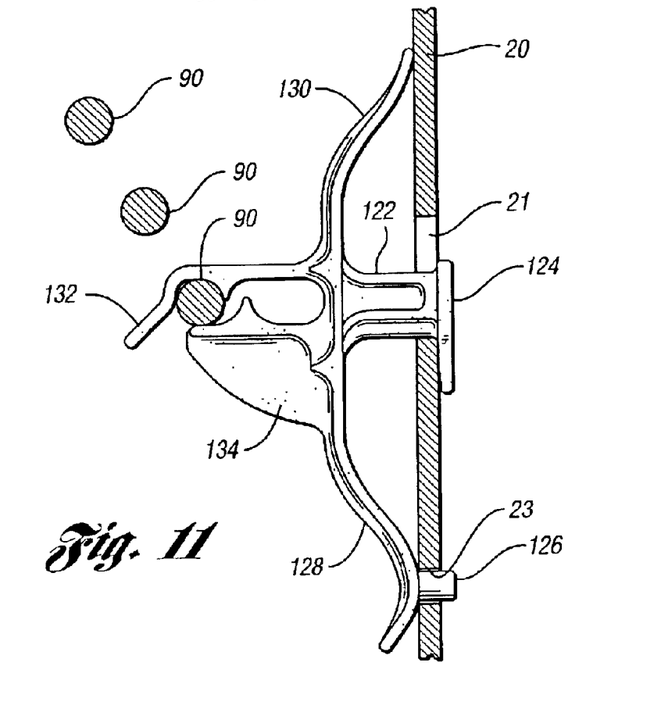
FIG. 11 is a perspective view of a clip used to secure the screen in the present invention.

The frame 20 has a plurality of support arms 24 that extend upwardly towards a top cover 26 to allow for easy cleaning and viewing. The top cover 26 has a central opening 28 sized to receive a dischargeable storage device 40. A screen 90 may be secured to the frame 20 using a variety of methods such as simple posts to support the screen or clips. One example of a clip that may be used is illustrated in FIG. 11. The clip 120 comprises a mounting stud 122 and mounting stop 124 insertable through an aperture 21 in the frame 20 and positioned downwardly such that the mouthing stop 124 is at least partially in contact with the frame. A retaining plug 126 may be inserted through an aperture 23 in the frame to prevent the clip 120 from moving upwardly.

The clip 120 has at least two tensioning arms 128, 130 which provide tension when the clip is installed to force the mounting stop 124 against the frame 20.

This is important in applications where proper locating of internal features is important and the outside of the frame 20 is in a known position such as when the frame is made by rotational molding. The clip 120 has an upper lip 132 and a lower lip 134 to hold the screen therebetween. Preferably, at least one lip is cantilevered. Further, preferably the lips 132, 134 contain a plurality of protrusions to firmly secure the screen. The clip 120 is injection-molded out of plastic.

The dischargeable storage device 40 includes a deck 42. The dischargeable storage device 40 is instantaneously moveable between a store position and a discharge position. The deck 42 preferably has an opening 44 therein in substantial alignment with the central opening 28. A hopper 46 having a cylindrical portion 48 is sized to fit in the opening 44 in the deck 42. The hopper 46 stores the food portions 11 therein until the food portions are ready to be distributed over the surface 15. Alternatively, the hopper 46 can be molded integrally with the dischargeable storage device 40.

The deck 42 includes an aperture 50 sized to receive a plunger 52. The plunger 52 has a central vertical opening 54 having an upper end 56 and a lower end 58. At the upper end 56, an upper alignment protrusion 57 projects downwardly. At the lower end 58, a lower alignment protrusion 59 projects upwardly. Two guide channels 60 extend inwardly from approximately the lower end 62 of the plunger 52.

The deck 42 comprises two downwardly extending first and second lower walls 64, 66 sized to fit in the centered opening 28 in the top cover 26. In the preferred embodiment, each lower wall has two colinear apertures 68, 70 adapted to receive a guide bracket 72. A downwardly extending contour support rib 74 may be provided to add support to the guide bracket 72.

A pair of pivotable trap doors 74, 76 are also provided on the dischargeable storage device 40. Each trap door comprises a guide post 78 sized and positioned to engage the corresponding guide channel 60 in the plunger 52. Each trap door also has at least one retainer portion 80.

One method of assembling the dischargeable storage device 40 is to first place a spring 82 in the central vertical opening 54 of the plunger 52 such that the ends of the spring 84, 86 are constrained by the upper and lower alignment protrusions 57, 59, respectively. The spring 82 and plunger 52 are then inserted through the aperture 50 in the deck 42. The retainer portions 80 of the trap doors 74, 76 are aligned with the apertures 68, 70 in the first and second lower walls 64, 66. The guide bracket 72 is then inserted through the apertures 68, 70 and the retainer portions 80 thereby retaining the trap doors 74, 76 in place. The plunger 52 is then fully depressed and the guide posts 78 are urged into the guide channels 60 of the plunger.

An edge 82 proximate the aperture 50 catches and restrains the spring 82 such that when the plunger 52 is pushed down, the spring 80 is compressed between the upper end 56 of the central vertical opening 54 of the plunger and the edge 82. The compressed spring 82 urges the plunger 52 upwardly.

Figure 10:
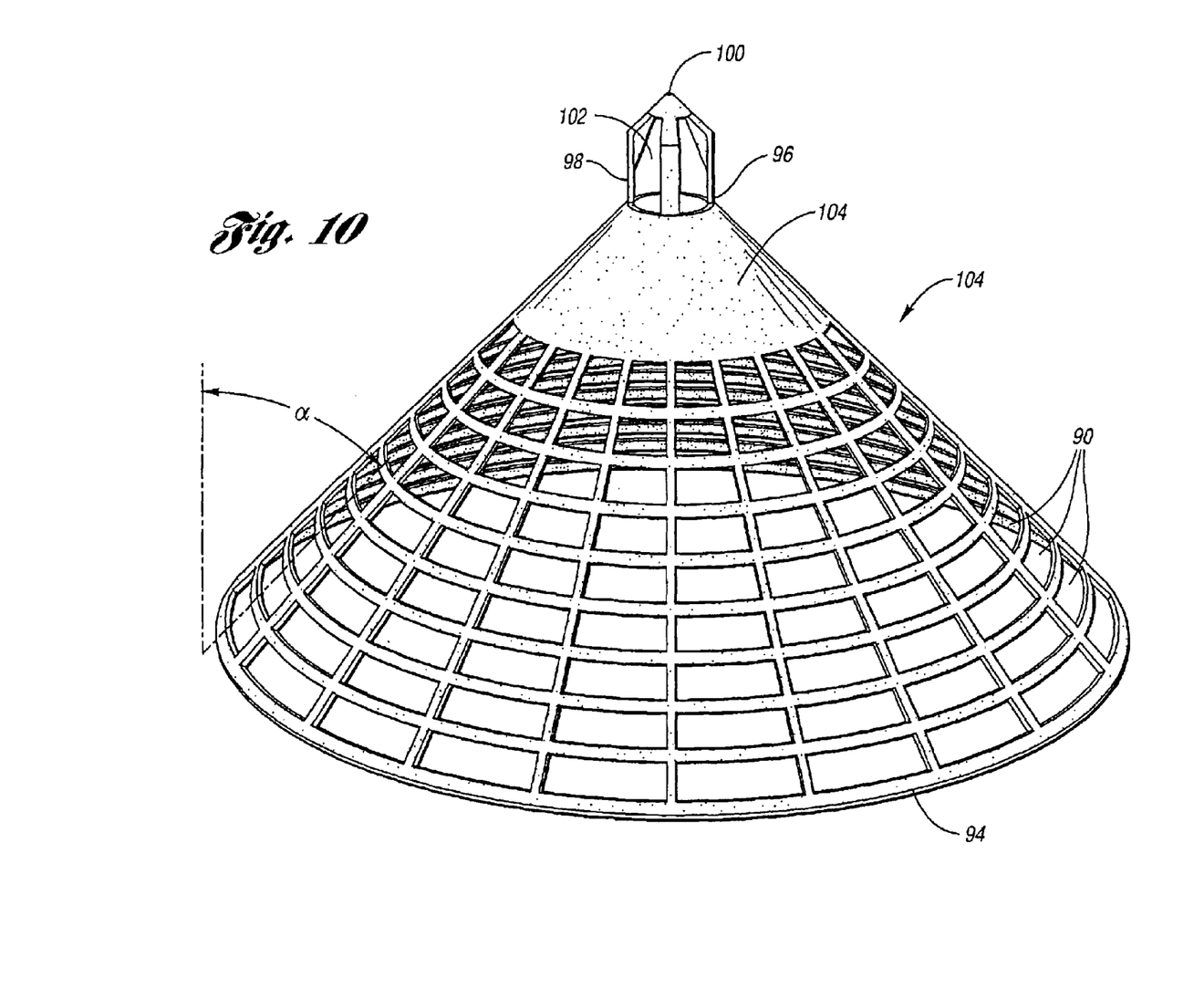
FIG. 10 is a perspective view of the screen of the present invention.

A screen 90 is provided having a plurality of openings 92 defined therein through which the food portions 11 fall through. The screen 90 has an outer rim 94 which engages the retainer posts 28 to constrain the screen in the frame 20. The screen 90 can be readily removed from the frame 20 for easy cleaning. Preferably, the screen 90 is manufactured out of polypropylene, though other materials may be used. The screen 90 converges to a conical surface 104 having an apex 96 having an upwardly extending cone 98 having a point 100 and cone openings 102 through which food portions 11 fall through. The cone 98 may be manufactured separately and attached to the screen 90. The apex 96 is substantial alignment with the hopper 46 and the trap doors 74, 76 to allow the food portion 11 to fall straight downward. The point 100 is designed to break apart and separate the food portions 11 so that they may distribute evenly along the conical surface 104 and the openings 92 to evenly distribute the food. The cone 98 is also provided with cone openings 102 through which food portions 11 may fall through to evenly distribute the food particles over the center of the surface 15. The size and position of the cone openings 102, the angle of the screen, the conical surface 104, and the openings 92 are designed such that food portions are evenly distributed over the entire surface. Preferably, the angle of the screen is between 30° and 60°. More preferably, the angle of the screen is 45°.

In operation, a surface 15, such as a pizza crust, is positioned under the apparatus 10. The size of the frame 20 and screen 90 are designed such that they are preferably slightly larger than the pizza crust. The center of the surface 15 is aligned with the center of the dischargeable storage device 40 and the screen 90. Food portions 11, such as blocks of shredded cheese, are placed in the hopper 46. The cheese may be tightly packed thereby requiring separation prior to being spread or loosely held together. The trap doors 74, 76 are shut because the spring 82 urges the plunger 52 upwardly thereby keeping the trap doors 74, 76 closed. The plunger 52 is quickly depressed such that the trap doors 74, 76 instantaneously open and the guideposts 78 travel within the guide channels 60. Preferably, the trap doors 74, 76 pivot freely and are thereby merely constrained by the guide channels 60, 61. In such a case, the guide posts 78 merely travel along the bottom surface of the guide channels 60. If, however, the trap doors 74, 76 do not pivot freely, then the upper surface 63 of the guide channel 60 exerts a force on the guide post 78 thereby forcing the guide post to travel in the guide channel and causing the trap doors to open. Regardless of the manner in which the trap doors 74, 76 open, the food portion 11 travels down the cylindrical portion 48 through the trap doors 74, 76 and contacts the point 100 on the cone. The point 100 causes the food portions 11 to break up and thereby distribute evenly along the conical surface 102 and through the openings 92. A portion of the food falls through the cone openings 92 and covers the central portion of the surface.

Figure 7:
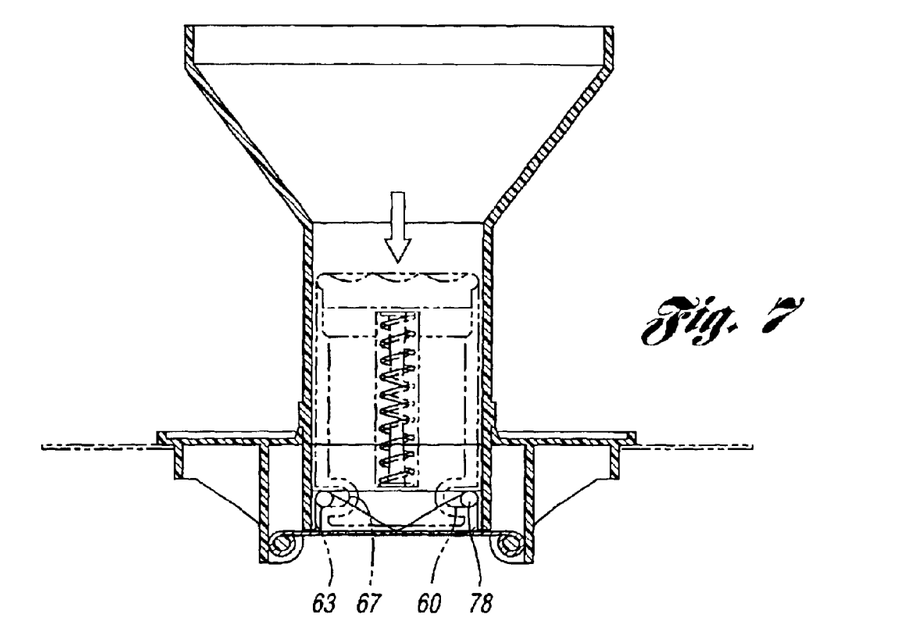
FIG. 7 is a sectional front view of the dischargeable storage device of the present invention in a fully closed position.
Figure 8:
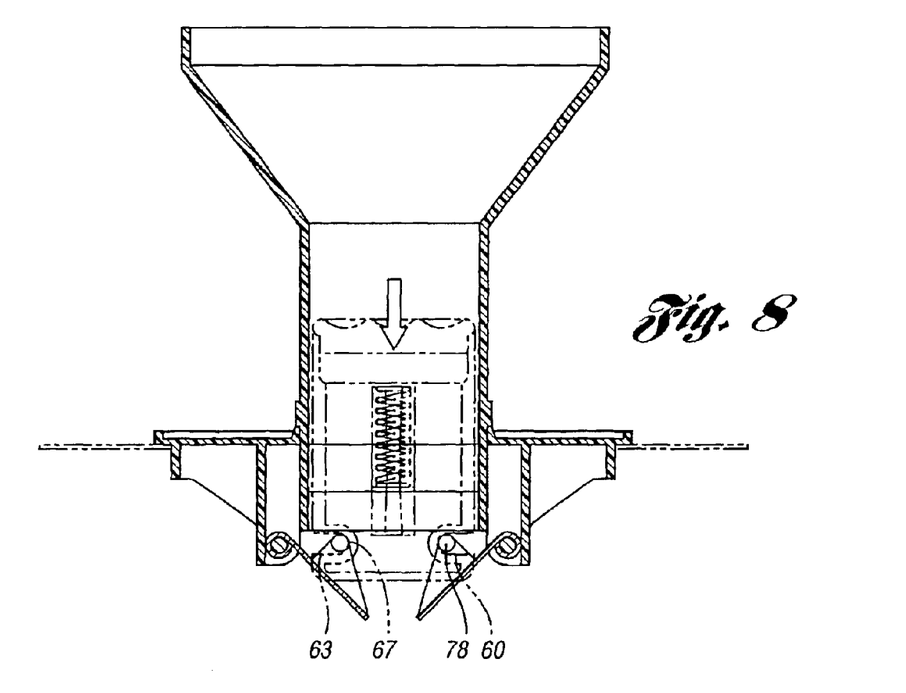
FIG. 8 is a sectional front view of the dischargeable storage device of the present invention in a partially open position.
Figure 9:
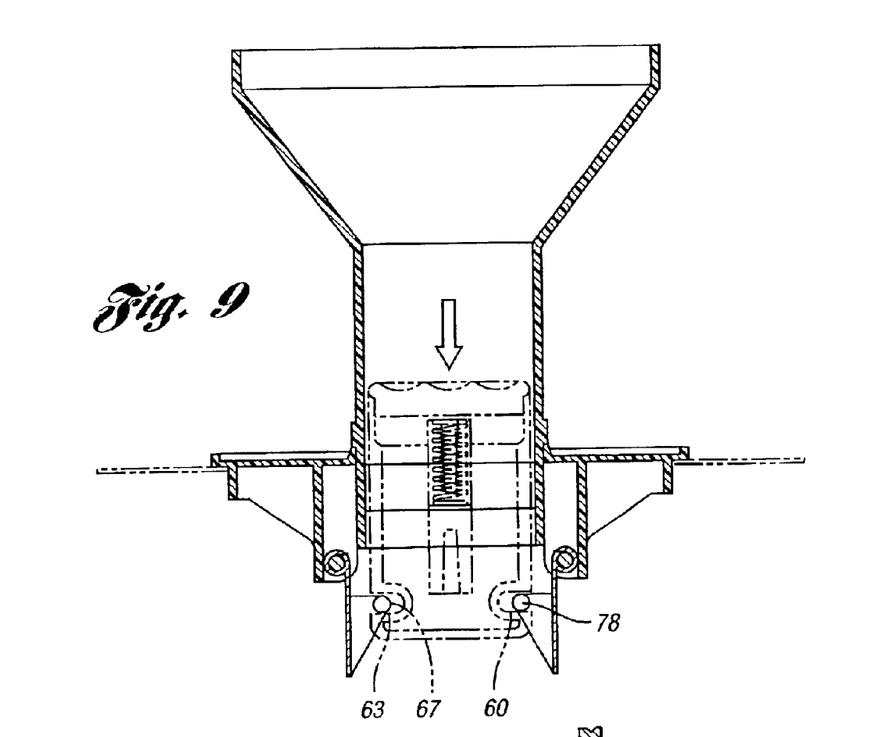
FIG. 9 is a sectional front view of the dischargeable storage device of the present invention in a fully opened position.

As shown in FIG. 7, when the trap doors 74, 76 are closed. i.e., for the dischargeable storage device 40 is in the store position, the guide posts 78 is proximate the openings 65 of the channels 60. As the plunger 52 is depressed, and the trap doors 74, 76 pivot, the guide posts 78 move towards the inside end 67 of the openings, as shown in FIG. 8. When the trap doors 74, 76 are fully open, i.e., the dischargeable storage device 40 is in the discharge position, the guide posts 78 again move towards the opening 65 of the channels as shown in FIG. 9.

If a surface smaller than the diameter of the screen 90 and/or frame 20 of the apparatus 10 is provided, the excess cheese will preferably be caught in a basin and reused.

After the cheese has been distributed upon the pizza, the pizza is removed from underneath the frame 20 and additional toppings may be applied to the pizza if they have not been already applied. The pizza is then baked.

The disclosed apparatus may be easily cleaned by removing the hopper 46 from the deck 42. The deck 42 may also be removed from the top cover 26. The trap doors 74, 76 may also be disassembled by removing the guide bracket 72 as described above. The frame 20 can be lifted off of the support 12 and the screen 90 can then be removed from the frame.

The components are made out of materials to facilitate cleaning. For example, the frame 20, the trap doors 74, 76, the guide bracket 72, and the spring 82 are preferably manufactured out of stainless steel. The funnel 26 is preferably made out of a linear low-density polyethylene. The screen is preferably made out of polypropylene. The dischargeable storage device 40 is preferably manufactured out of a plastic such as acetyl or polyformaldehyde. Of course, other materials, including other dishwasher-safe plastics or metals, may be used.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for evenly distributing predetermined portions of food over a surface comprising:
    a frame adapted to be superimposed over the surface to receive the food;
    a screen mounted on the frame and being of conical configuration and converging away from the direction of the surface to receive the food, the screen having an axis and a plurality of openings defined therein through which the food may fall;
    a hopper mounted on the frame in spaced relationship above the screen having a food confinement portion substantially aligned with the screen axis; and
    a dischargeable storage device substantially aligned with the screen axis, the dischargeable storage device instantaneously movable between a store position in which the food is stored and a release position wherein the food is permitted to fall through the dischargeable storage device and onto the screen, the food separating and being substantially evenly distributed below the screen over the surface upon the food engaging the screen and the food falling therethrough, the dischargeable storage device comprising:
        a deck having an aperture therethrough and a pair of pivotable trap doors, each door having a guide post; and
        a plunger moveable within the aperture and having two guide channels, each guide channel adapted to cooperate with one of the guide posts such that when the plunger is depressed, the guide channels force the guide posts thereby opening the trap doors.

2. The apparatus of claim 1 further comprising a pivot bracket attached to the deck wherein the trap doors are pivotably secured to the bracket.

3. The apparatus of claim 1 further comprising a spring positioned between a portion of the plunger and the deck such that the spring biases the plunger upwards to maintain the trap doors closed.

4. The apparatus of claim 1
    wherein the deck comprises an edge proximate the aperture;
    wherein the plunger comprises a central vertical opening having an upper end and a lower end; and
    the dischargeable storage device further comprises a spring retained between the upper end of the central opening of the plunger and the edge proximate the aperture, the spring upwardly biasing the plunger to maintain the trap doors closed.

5. The apparatus of claim 1 wherein the screen comprises a cone at the apex of the screen, the cone in substantial alignment with the dischargeable storage device.

6. The apparatus of claim 1 further comprising:
    a generally U-shaped bracket secured to the deck;
    wherein the pivotable trap doors are pivotally attached to the U-shaped bracket.

7. The apparatus of claim 1 wherein the plunger has a top surface having plurality of depressing thereon.

8. The apparatus of claim further comprising a support and wherein the frame is placed on the support over the surface to receive the food.

9. The apparatus of claim 8 wherein the support comprises a plurality of inwardly projecting braces to support the frame.

10. An apparatus for evenly distributing predetermined portions of food over a surface comprising:
    a support superimposed over the surface to receive the food;
    a frame adapted to be supported by the support;
    a screen mounted on the frame and being of conical configuration and converging away from the direction of the surface to receive the food, the screen having an axis and a plurality of openings defined therein through which the food may fall;
    a hopper mounted on the frame in spaced relationship above the screen having a food confinement portion substantially aligned with the screen axis; and
    a dischargeable storage device substantially aligned with the screen axis, the dischargeable storage device instantaneously movable between a store position in which the food is stored and a release position wherein the food is permitted to fall through the dischargeable storage device and onto the screen, the food separating and being substantially evenly distributed below the screen over the surface upon the food engaging the screen and the food falling therethrough, the dischargeable storage device comprising:
        a deck having an aperture therethrough and a pair of pivotable trap doors, each door having a guide post; and
        a plunger moveable within the aperture and having two guide channels, each guide channel adapted to cooperate with one of the guide posts such that when the plunger is depressed, the guide channels force the guide posts thereby opening the trap doors.

11. An apparatus for evenly distributing predetermined portions of food over a surface comprising:
    a frame adapted to be superimposed over the surface to receive the food;
    a screen mounted on the frame and being of conical configuration and converging away from the direction of the surface to receive the food, the screen having an axis and a plurality of openings defined therein through which the food may fall;
    a hopper mounted on the frame in spaced relationship above the screen having a food confinement portion substantially aligned with the screen axis;
    a dischargeable storage device substantially in alignment with the screen axis, the dischargeable storage device instantaneously movable between a store position in which the food is stored and a release position wherein the food is permitted to fall through the dischargeable storage device and onto the screen, the food separating and being substantially evenly distributed below the screen over the surface upon the food engaging the screen and the food falling therethrough; and wherein the screen further comprises a cone at the apex of the screen, the cone in alignment with the dischargeable storage device so that the food discharged from the dischargeable storage device falls onto the cone and is more evenly distributed wherein the cone comprises a point and cut-out portion around the point.

12. An apparatus for evenly distributing predetermined portions of food over a surface comprising:

a frame adapted to be superimposed over the surface to receive the food;

a screen mounted on the frame and being of conical configuration and converging away from the direction of the surface to receive the food, the screen having an axis and a plurality of openings defined therein through which the food may fall;

a hopper mounted on the frame in spaced relationship above the screen having a food confinement portion substantially aligned with the screen axis;

a dischargeable storage device substantially in alignment with the screen axis, the dischargeable storage device instantaneously movable between a store position in which the food is stored and a release position wherein the food is permitted to fall through the dischargeable storage device and onto the screen, the food separating and being substantially evenly distributed below the screen over the surface upon the food engaging the screen and the food falling therethrough; and wherein the screen further comprises a cone at the apex of the screen, the cone in alignment with the dischargeable storage device so that the food discharged from the dischargeable storage device falls onto the cone and is more evenly distributed wherein the frame comprises a plurality of posts projecting inwardly, each post comprising a cut-Out portion, and wherein the screen comprises support portions sized to be received in the cut-out portions.

13. The apparatus of claim 11 further comprising a support and wherein the frame is placed on the support over the surface to receive the food.

14. The apparatus of claim 13 wherein the support comprises a plurality of inwardly projecting braces to support the frame.

* * * * *

UNITED STATES PATENT AND TRADEMARK OFFICE
CERTIFICATE OF CORRECTION

PATENT NO.    : 6,755,122 B2
DATED         : June 29, 2004
INVENTOR(S)   : William C. Holmes It is certified that error appears in the above-identified patent and that said Letters Patent is hereby corrected as shown below:

Column 6,
Line 13, after "claim" insert -- 1 --.

Column 8,
Line 15, delete "cut-Out" and insert -- cut-out --.

Signed and Sealed this

Sixteenth Day of November, 2004

JON W. DUDAS
*Director of the United States Patent and Trademark Office*